(12) United States Patent
Najt et al.

(10) Patent No.: US 8,096,108 B2
(45) Date of Patent: Jan. 17, 2012

(54) ENGINE WARM-UP OF A HOMOGENEOUS CHARGE COMPRESSION IGNITION ENGINE

(75) Inventors: Paul M. Najt, Bloomfield Hills, MI (US); Tang-Wei Kuo, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 936 days.

(21) Appl. No.: 12/109,409

(22) Filed: Apr. 25, 2008

(65) Prior Publication Data

US 2008/0271436 A1    Nov. 6, 2008

Related U.S. Application Data

(60) Provisional application No. 60/915,141, filed on May 1, 2007.

(51) Int. Cl.
*F01N 3/00* (2006.01)
(52) U.S. Cl. ................... 60/285; 60/274; 60/276
(58) Field of Classification Search ............ 60/274, 60/276, 285, 299
See application file for complete search history.

(56) References Cited

U.S. PATENT DOCUMENTS

| | | | |
|---|---|---|---|
| 6,055,948 A | 5/2000 | Shiraishi et al. | |
| 6,837,040 B2 | 1/2005 | Sonoda et al. | |
| 6,971,365 B1 | 12/2005 | Najt et al. | |
| 6,994,072 B2 | 2/2006 | Kuo et al. | |
| 7,128,047 B2 | 10/2006 | Kuo et al. | |
| 7,152,559 B2 | 12/2006 | Kuo et al. | |
| 7,191,589 B2 | 3/2007 | Yasui et al. | |
| 7,469,180 B2 * | 12/2008 | Yasui et al. | 701/105 |
| 2005/0000492 A1 | 1/2005 | Nakai et al. | |
| 2006/0288983 A1 | 12/2006 | Watanabe et al. | |

OTHER PUBLICATIONS

U.S. Appl. No. 11/941,200, Kuo et al.

* cited by examiner

*Primary Examiner* — Thomas Denion
*Assistant Examiner* — Diem Tran (57) ABSTRACT

A method is disclosed for controlling operation of an HCCI internal combustion engine effective for robust engine warm-up operation. The method includes selectively implementing ones of a plurality of operating modes in response to predetermined catalyst and engine temperature conditions.

19 Claims, 4 Drawing Sheets

ENGINE WARM-UP OF A HOMOGENEOUS CHARGE COMPRESSION IGNITION ENGINE

CROSS REFERENCE TO RELATED APPLICATIONS

This application claims the benefit of U.S. Provisional Application No. 60/915,141 filed on May 1, 2007 which is hereby incorporated herein by reference.

TECHNICAL FIELD

This disclosure pertains generally to internal combustion engine control systems, and more specifically to a method and apparatus to control a homogeneous charge compression ignition engine.

BACKGROUND

One engine system being developed for controlled auto-ignition combustion operation comprises an internal combustion engine designed to operate under an Otto cycle. The engine, equipped with direct in-cylinder fuel-injection, operates in a controlled auto-ignition mode under specific engine operating conditions to achieve improved engine fuel efficiency. A spark ignition system is employed to supplement the auto-ignition combustion process during specific operating conditions. Such engines are referred to as Homogeneous Charge Compression Ignition (hereinafter 'HCCI') engines.

An HCCI engine operating in HCCI combustion mode creates a charge mixture of combusted gases, air, and fuel in a combustion chamber, and auto-ignition is initiated simultaneously from many ignition sites within the charge mixture during a compression stroke, resulting in stable power output, high thermal efficiency and low emissions. The combustion is highly diluted and uniformly distributed throughout the charge mixture, resulting in low burnt gas temperature and NOx emissions typically substantially lower than NOx emissions of either a traditional spark ignition engine, or a traditional diesel engine.

HCCI has been demonstrated in two-stroke gasoline engines using conventional compression ratios. It is believed that the high proportion of burnt gases remaining from the previous cycle, i.e., the residual content, within the two-stroke engine combustion chamber is responsible for providing the high mixture temperature necessary to promote auto-ignition in a highly diluted mixture.

In four-stroke engines with traditional valve means, the residual content is low and HCCI at part load is difficult to achieve. Known methods to induce HCCI at low and part loads include: 1) intake air heating, 2) variable compression ratio, and 3) blending gasoline with ignition promoters to create a more easily ignitable mixture than gasoline. In all the above methods, the range of engine speeds and loads in which HCCI can be achieved is relatively narrow. Extended range HCCI has been demonstrated in four-stroke gasoline engines using variable valve actuation with certain valve control strategies that effect a high proportion of residual combustion products from previous combustion cycle necessary for HCCI in a highly diluted mixture. With such valve strategies, the range of engine speeds and loads in which HCCI can be achieved is greatly expanded using a conventional compression ratio. One such valve strategy includes trapping and recompression of exhaust gases by early closure of the exhaust valve during the exhaust stroke and low valve lift. Such valve control can be implemented using variable cam phasers and two-step lift cams.

Whereas the above-mentioned HCCI engine operating strategies are based upon extensive steady-state tests under fully warmed-up engine operating conditions, cold starting and engine warm-up operation pose some additional challenges.

SUMMARY

The present disclosure comprises a method for controlling operation of an HCCI internal combustion engine effective for robust engine warm-up operation.

A four-stroke internal combustion engine includes a variable volume combustion chamber defined by a piston reciprocating within a cylinder between top-dead center and bottom-dead center points, intake and exhaust passages, and intake and exhaust valves controlled during repetitive, sequential exhaust, intake, compression and expansion strokes of the piston, a direct injection fuel system and a spark ignition system. A method for controlling the engine includes selectively implementing ones of a plurality of operating modes in response to predetermined catalyst and engine temperature conditions. This selectively implementing includes monitoring a catalyst temperature. If the catalyst temperature is less than a threshold catalyst temperature, the engine is operated in a high-lift cams, spark ignition mode including a near stoichiometric air/fuel ratio and full lift and duration valve events. If the catalyst temperature is not less than a threshold catalyst temperature, the engine is operated in a low-lift cams mode.

BRIEF DESCRIPTION OF THE DRAWINGS

The disclosure may take physical form in certain parts and arrangement of parts, the preferred embodiment of which will be described in detail and illustrated in the drawings incorporated hereinafter, comprising.

DETAILED DESCRIPTION

Figure 1:
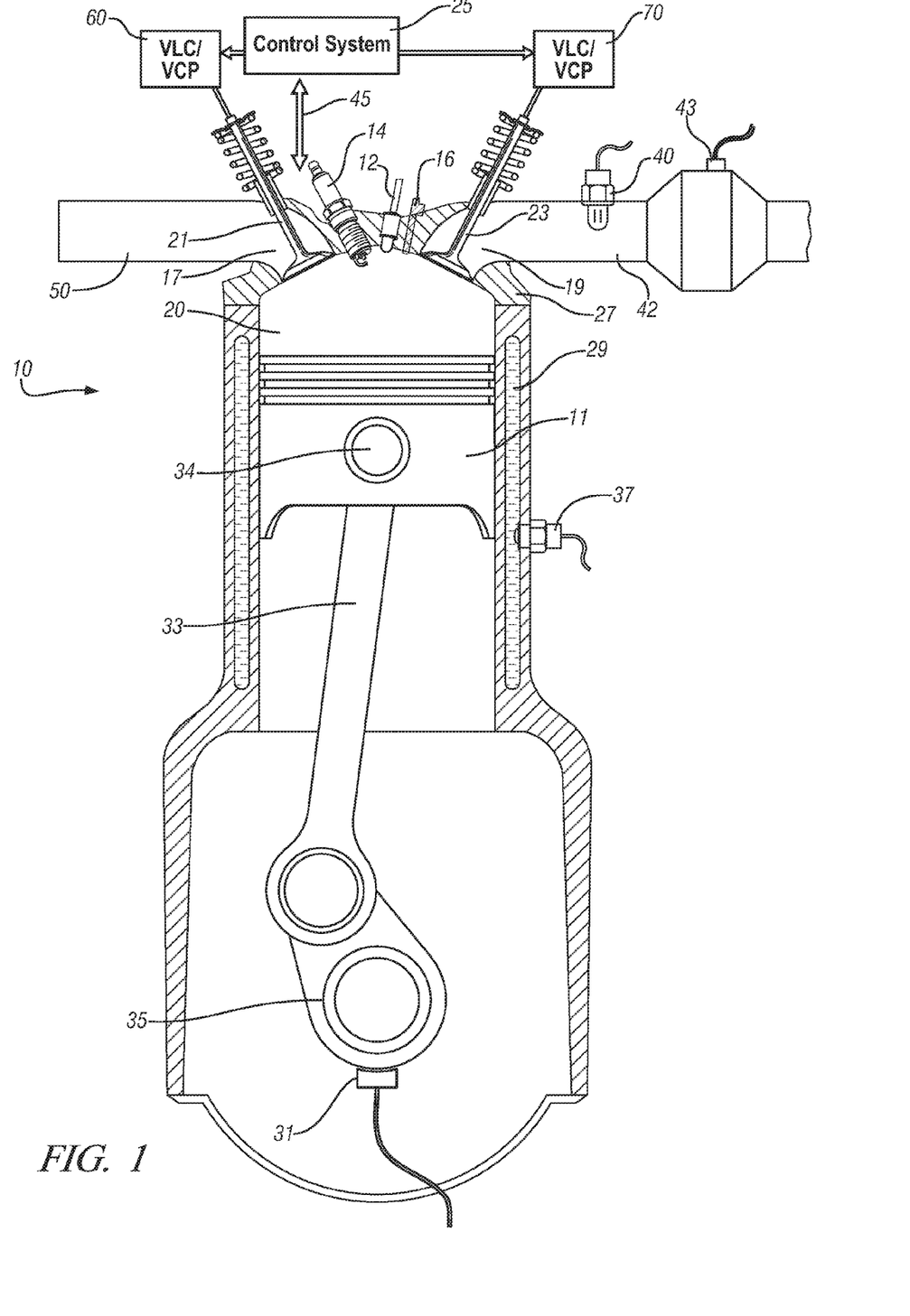
FIG. 1 is a schematic illustration of an exemplary internal combustion engine adapted for HCCI and SI operating modes.

Referring now to the drawings, wherein the showings are for the purpose of illustrating certain exemplary embodiments only and not for the purpose of limiting the same, FIG. 1 shows a schematic of an internal combustion engine 10 and control system 25 which has been constructed in accordance with an embodiment of the present disclosure. The embodiment as shown is applied as part of an overall control scheme to operate an exemplary multi-cylinder, spark ignition, direct-injection, gasoline, four-stroke internal combustion engine adapted to operate under a controlled auto-ignition process, also referred to as homogenous-charge, compression-ignition ('HCCI') mode In the present exemplary exposition of the disclosure, a naturally aspirated, a four-stroke, single cylinder, 0.55 liter, controlled auto-ignition, gasoline direct injection fueled internal combustion engine having a compression ratio of substantially 12 to 13 was utilized in implementing the valve and fueling controls and acquisition of the various data embodied herein. Unless specifically discussed otherwise, all such implementations and acquisitions are assumed to be carried out under standard conditions as understood by one having ordinary skill in the art.

The exemplary engine 10 includes a cast-metal engine block with a plurality of cylinders formed therein, one of which is shown, and an engine head 27. Each cylinder comprises a closed-end cylinder having a moveable, reciprocating piston 11 inserted therein. A variable volume combustion chamber 20 is formed in each cylinder, and is defined by walls of the cylinder, the moveable piston 11, and the head 27. The engine block preferably includes coolant passages 29 through which engine coolant fluid passes. A coolant temperature sensor 37, operable to monitor temperature of the coolant fluid, is located at an appropriate location, and provides a parametric signal input to the control system 25 useable to control the engine. The engine preferably includes known systems including an external exhaust gas recirculation ('EGR') valve and an intake air throttle valve (not shown).

Each moveable piston 11 comprises a device designed in accordance with known piston forming methods, and includes a top and a body which conforms substantially to the cylinder in which it operates. The piston has top or crown area that is exposed in the combustion chamber. Each piston is connected via a pin 34 and connecting rod 33 to a crankshaft 35. The crankshaft 35 is rotatably attached to the engine block at a main bearing area near a bottom portion of the engine block, such that the crankshaft is able to rotate around an axis that is perpendicular to a longitudinal axis defined by each cylinder. A crank sensor 31 is placed in an appropriate location, operable to generate a signal that is useable by the controller 25 to measure crank angle, and which is translatable to provide measures of crankshaft rotation, speed, and acceleration that are useable in various control schemes. During operation of the engine, each piston 11 moves up and down in the cylinder in a reciprocating fashion due to connection to and rotation of the crankshaft 35, and the combustion process. The rotation action of the crankshaft effects translation of linear force exerted on each piston during combustion to an angular torque output from the crankshaft, which can be transmitted to another device, e.g. a vehicle driveline.

The engine head 27 comprises a cast-metal device having one or more intake ports 17 and one or more exhaust ports 19 which flow to the combustion chamber 20. The intake port 17 supplies air to the combustion chamber 20. Combusted (burned) gases flow from the combustion chamber 20 via exhaust port 19. Flow of air through each intake port is controlled by actuation of one or more intake valves 21. Flow of combusted gases through each exhaust port is controlled by actuation of one or more exhaust valves 23.

The intake and exhaust valves 21, 23 each have a head portion that includes a top portion that is exposed to the combustion chamber. Each of the valves 21, 23 has a stem that is connected to a valve actuation device. A valve actuation device, depicted as 60, is operative to control opening and closing of each of the intake valves 21, and a second valve actuation device 70 operative to control opening and closing of each of the exhaust valves 23. Each of the valve actuation devices 60, 70 comprises a device signally connected to the control system 25 and operative to control timing, duration, and magnitude of opening and closing of each valve, either in concert or individually. The first embodiment of the exemplary engine comprises a dual overhead cam system which has variable lift control ('VLC') and variable cam phasing ('VCP'). The VCP device is operative to control timing of opening or closing of each intake valve and each exhaust valve relative to rotational position of the crankshaft and opens each valve for a fixed crank angle duration. The exemplary VLC device is operative to control magnitude of valve lift to one of two positions: one position to 3-5 mm lift for an open duration of 120-150 crank angle degrees, and another position to 9-12 mm lift for an open duration of 220-260 crank angle degrees. Individual valve actuation devices can serve the same function to the same effect. The valve actuation devices are preferably controlled by the control system 25 according to predetermined control schemes. Alternative variable valve actuation devices including, for example, fully flexible electrical or electro-hydraulic devices may also be used and have the further benefit of independent opening and closing phase control as well as substantially infinite valve lift variability within the limits of the system. A specific aspect of a control scheme to control opening and closing of the valves is described herein.

Air is inlet to the intake port 17 through an intake manifold runner 50, which receives filtered air passing through a known air metering device and a throttle device (not shown). Exhaust gas passes from the exhaust port 19 to an exhaust manifold 42, which includes exhaust gas sensors 40 operative to monitor constituents of the exhaust gas feedstream, and determine parameters associated therewith. The exhaust gas sensors 40 can comprise any of several known sensing devices operative to provide parametric values for the exhaust gas feedstream, including air/fuel ratio, or measurement of exhaust gas constituents, e.g. NOx, CO, HC, and others. The system may include an in-cylinder sensor 16 for monitoring combustion pressures, or non-intrusive pressure sensors or inferentially determined pressure determination (e.g. through crankshaft accelerations). The aforementioned sensors and metering devices each provide a signal as a parametric input to the control system 25. These parametric inputs can be used by the control system to determine combustion performance measurements.

The control system 25 preferably comprises a subset of an overall control architecture operable to provide coordinated system control of the engine 10 and other systems. In overall operation, the control system 25 is operable to synthesize operator inputs, ambient conditions, engine operating parameters, and combustion performance measurements, and execute algorithms to control various actuators to achieve targets for control parameters, including such parameters as fuel economy, emissions, performance, and driveability. The control system 25 is operably connected to a plurality of devices through which an operator typically controls or directs operation of the engine. Exemplary operator inputs include an accelerator pedal, a brake pedal, transmission gear selector, and vehicle speed cruise control when the engine is employed in a vehicle. The control system may communicate with other controllers, sensors, and actuators via a local area network ('LAN') bus (not shown) which preferably allows for structured communication of control parameters and commands between various controllers.

The control system 25 is operably connected to the engine 10, and functions to acquire parametric data from sensors, and control a variety of actuators of the engine 10 over appropriate interfaces 45. The control system 25 receives an engine torque command, and generates a desired torque output, based upon the operator inputs. Exemplary engine operating parameters that are sensed by control system 25 using the aforementioned sensors include engine temperature, as indexed by methods such as monitoring engine coolant temperature, oil temperature, or metal temperature; crankshaft rotational speed ('RPM') and position; manifold absolute pressure; ambient air flow and temperature; and ambient air pressure. Combustion performance measurements typically comprise measured and inferred combustion parameters, including air/fuel ratio, location of peak combustion pressure, among others.

Actuators controlled by the control system 25 include: fuel injectors 12; the VCP/VLC valve actuation devices 60, 70; spark plug 14 operably connected to ignition modules for controlling spark dwell and timing; exhaust gas recirculation (EGR) valve (not shown), and, electronic throttle control module (not shown). Fuel injector 12 is preferably operable to inject fuel directly into each combustion chamber 20. Specific details of exemplary direct injection fuel injectors are known and not detailed herein. Spark plug 14 is employed by the control system 25 to enhance ignition timing control of the exemplary engine across portions of the engine speed and load operating range. When the exemplary engine is operated in a purely HCCI mode, the engine does not utilize an energized spark plug. However, it has proven desirable to employ spark ignition to complement the HCCI mode under certain conditions, including, e.g. during cold start, to prevent fouling and, in accordance with certain aspects of the present disclosure at low load operating conditions near a low-load limit. Also, it has proven preferable to employ spark ignition at a high load operation limit in the HCCI mode, and at high speed/load operating conditions under throttled or un-throttled spark-ignition operation.

The control system 25 preferably comprises a general-purpose digital computer generally comprising a microprocessor or central processing unit, read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Each controller has a set of control algorithms, comprising resident program instructions and calibrations stored in ROM and executed to provide the respective functions of each computer.

Algorithms for engine control are typically executed during preset loop cycles such that each algorithm is executed at least once each loop cycle. Algorithms stored in the non-volatile memory devices are executed by the central processing unit and are operable to monitor inputs from the sensing devices and execute control and diagnostic routines to control operation of the engine, using preset calibrations. Loop cycles are typically executed at regular intervals, for example each 3.125, 6.25, 12.5, 25 and 100 milliseconds during ongoing engine operation. Alternatively, algorithms may be executed in response to occurrence of an event or interrupt request.

With reference now to FIGS. 2-8, illustration is given of coordinated valve, fueling and spark control employed in effecting engine idle warm-up operations in accordance with the present disclosure. Each of FIGS. 2-7 illustrates along a horizontal axis engine crank angle with a reference at zero corresponding to top dead center (TDC) between the exhaust and intake strokes of the piston. Intake and exhaust valve lift is represented by the vertical axis and generally includes low and high lift points as illustrated corresponding to the low and high lift cam lifts that are enabled by the exemplary two-step lift cams of the exemplary hardware embodiment. Each of FIGS. 2-7 correspond to various engine operation modes selectively employed in engine idle warm-up routines in accordance with the present disclosure. An engine idle warm-up operating region generally corresponds to engine operating temperatures, indexed in this exemplary embodiment through coolant temperature, from 30 degrees Celsius and below through about 80 to 90 degrees Celsius. Within such an engine idle warm up operating region, all FIGS. 2-7 represent operation of the engine in a spark-assisted HCCI mode with split injections as discussed in further detail herein below. Engine operating temperatures above about 80 to 90 degrees Celsius are, for purposes of the present disclosure, considered fully warmed up and conducive to alternative HCCI operating modes which are beyond the scope of the present disclosure.

Figure 2:
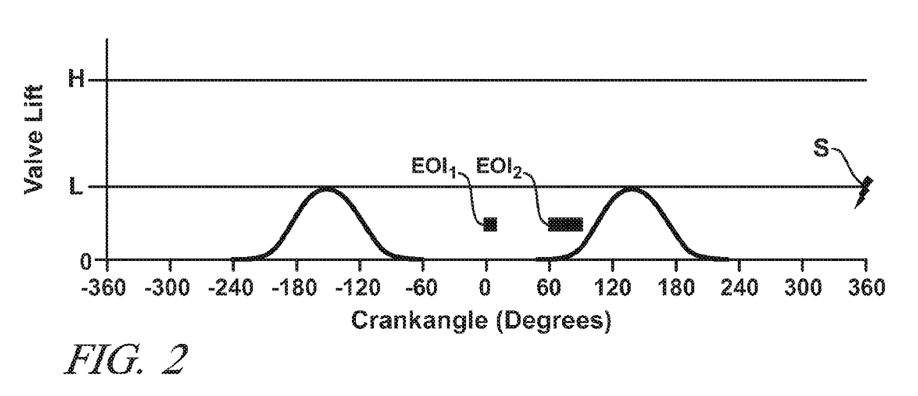
FIG. 2 illustrates coordinated valve, fueling and spark control employed in effecting a crank & fire, spark assist, HCCI mode in accordance with the present disclosure.
Figure 3:
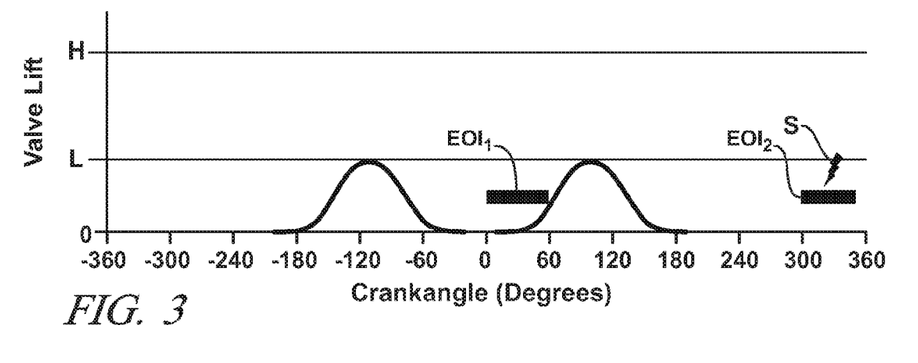
FIG. 3 illustrates coordinated valve, fueling and spark control employed in effecting a low-lift, crank & fire, spark ignition mode in accordance with the present disclosure.
Figure 4:
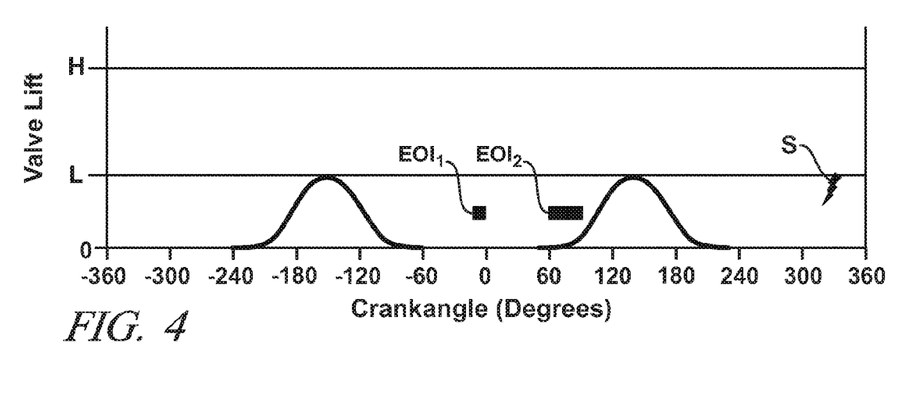
FIG. 4 illustrates coordinated valve, fueling and spark control employed in effecting a cold HCCI mode in accordance with the present disclosure.
Figure 5:
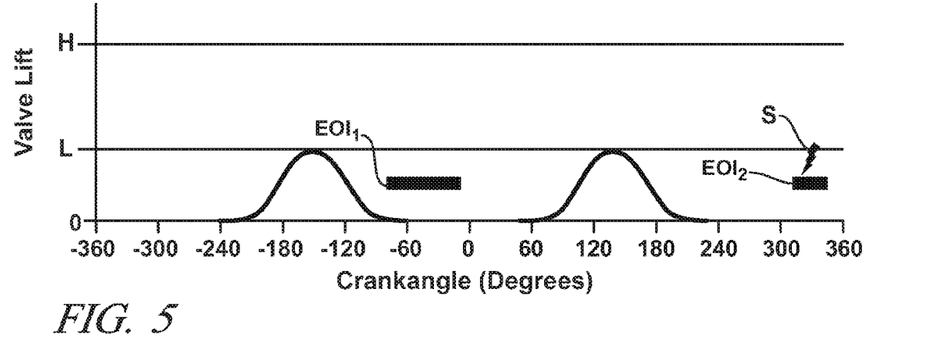
FIG. 5 illustrates coordinated valve, fueling and spark control employed in effecting a transition to HCCI mode in accordance with the present disclosure.

The modes illustrated in FIGS. 2, 4 and 5 are carried out using a NVO setting of preferably between about 180 to about 200 crank angle degrees at or close to the NVO limits of the VCP. The mode illustrated in FIG. 3, however, is carried out with a modest to minimal NVO setting preferably between about 0 and 90 crank angle degrees. Certain preferential injection timings including general combustion cycle region placements of the split injections as well as injection specific end of injection timings and trends are set forth in further detail herein below. Engine idle speed of substantially 800 to 1000 rev/min was utilized.

In a crank & fire, spark assist, HCCI mode as shown in FIG. 2, the engine is operated with split injection with the first injection end of injection ($EOI_1$) taking place during NVO and the second injection end of injection ($EOI_2$) also taking place during NVO. More particularly, $EOI_1$ preferably takes place about 350 to about 360 crank angle degrees bTDC combustion and $EOI_2$ preferably takes place about 270 to about 300 crank angle degrees bTDC combustion. A preferred range for spark delivery during this mode is about 0 to about 10 crank angle degrees bTDC combustion.

A low-lift crank & fire, spark ignition mode is shown in FIG. 3. During this mode, the engine is operated with a near stoichiometric air/fuel ratio, modest to minimal NVO, and split injection with the first injection end of injection ($EOI_1$) taking place during NVO and the second injection end of injection ($EOI_2$) taking place late in the compression stroke. A preferred range for NVO during this mode is about 0 to about 60 crank angle degrees. A preferred range for first fraction fuel delivery during this mode is about 300 to about 360 crank angle degrees bTDC combustion and for second fraction fuel delivery during SI mode cold start operation is about 10 to about 60 crank angle degrees bTDC combustion A preferred range for spark delivery during this mode is about 0 to about 50 crank angle degrees bTDC combustion.

In a cold HCCI mode as shown in FIG. 4 the engine is operated with split injection with the first injection end of injection ($EOI_1$) taking place during NVO and the second injection end of injection ($EOI_2$) taking place during NVO or early intake phase. More particularly, $EOI_1$ preferably takes place about 360 to about 370 crank angle degrees bTDC combustion and $EOI_2$ preferably takes place about 270 to about 300 crank angle degrees bTDC combustion. While split injection as described is preferred for this mode, a single injection—at least partially during NVO—of the total cycle fuel mass may be satisfactorily employed. In order to simplify the control algorithm development, only split injection strategy will be described and implemented herein. A preferred range for spark delivery during this mode is about 10 to about 60 crank angle degrees bTDC combustion.

In a transition to HCCI mode as shown in FIG. 5, the engine is operated with split injection. However, the first injection end of injection ($EOI_1$) takes place during NVO whereas the second injection end of injection ($EOI_2$) takes place during the compression phase. More particularly, $EOI_1$ preferably takes place about 370 to about 440 crank angle degrees bTDC combustion and $EOI_2$ preferably takes place about 25 to about 50 crank angle degrees bTDC combustion. A preferred range for spark delivery during low temperature warm-up operation is about 10 to about 60 crank angle degrees bTDC combustion.

Figure 6:
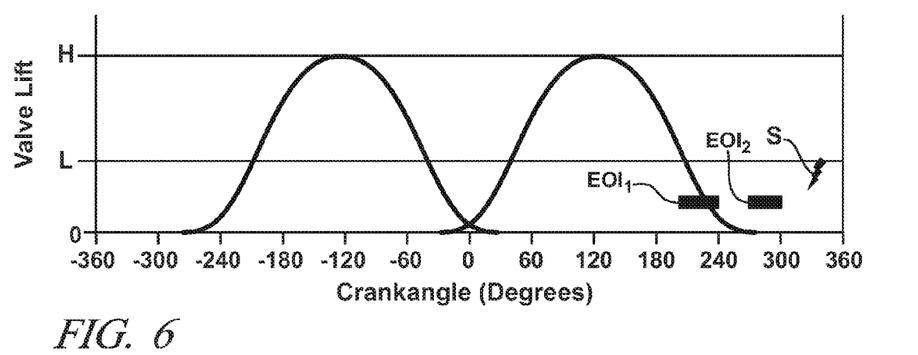
FIG. 6 illustrates coordinated valve, fueling and spark control employed in effecting a high-lift, crank & fire, spark ignition mode in accordance with the present disclosure.

A high-lift, crank & fire, spark ignition mode is shown in FIG. 6 using high lift cams with split injection. During this mode, the engine is operated with a near stoichiometric air/fuel ratio, full lift and duration valve events, minimum valve overlap, and single or split injection during the compression stroke. Preferred ranges for NVO during this mode is about −40 to about 0 crank angle degrees. Where split injection is practiced, a preferred range for the first injection end of injection ($EOI_1$) during this mode is about 120 to about 160 crank angle degrees bTDC combustion and for the second injection end of injection ($EOI_2$) about 60 to about 90 crank angle degrees bTDC combustion. Otherwise, where a single injection is practiced during this mode, a preferred range for a single injection end of injection is about 60 to about 120 crank angle degrees bTDC combustion. A preferred range for spark delivery during this mode is about 0 to about 50 crank angle degrees bTDC combustion regardless of whether split or single injection is practiced.

Figure 7:
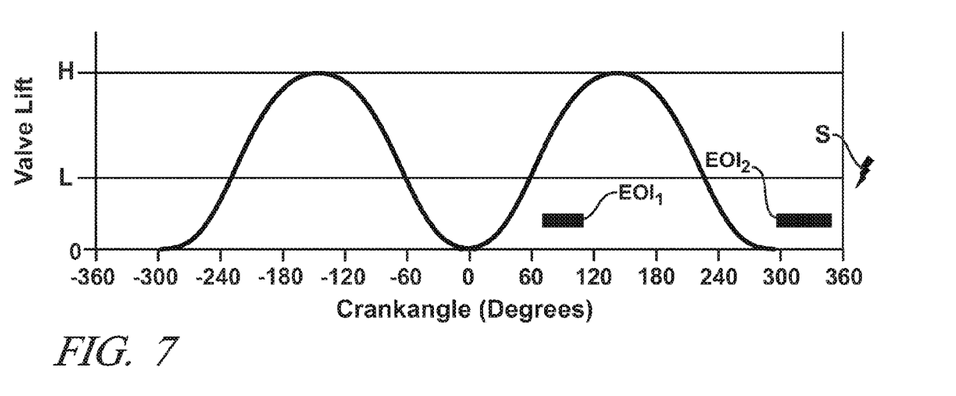
FIG. 7 illustrates coordinated valve, fueling and spark control employed in effecting a catalyst heating mode in accordance with the present disclosure.

A catalyst heating, spark ignition mode is shown in FIG. 7 using high lift cams split injection. During this mode, the engine is operated with a near stoichiometric air/fuel ratio, full lift and duration valve events, a modest level of NVO to minimize exhaust emissions, split injection between the intake stroke ($EOI_1$) and the compression stroke ($EOI_2$), and retarded spark timing, preferably aTDC combustion. A preferred range for NVO during this mode is about 0 to about 40 crank angle degrees. A preferred range for first fraction fuel delivery during this mode is about 250 to about 290 crank angle degrees bTDC combustion and for second fraction fuel delivery about 10 to about 60 crank angle degrees bTDC combustion. A preferred range for spark delivery during this mode is about 0 to about 30 crank angle degrees aTDC combustion.

Figure 8:
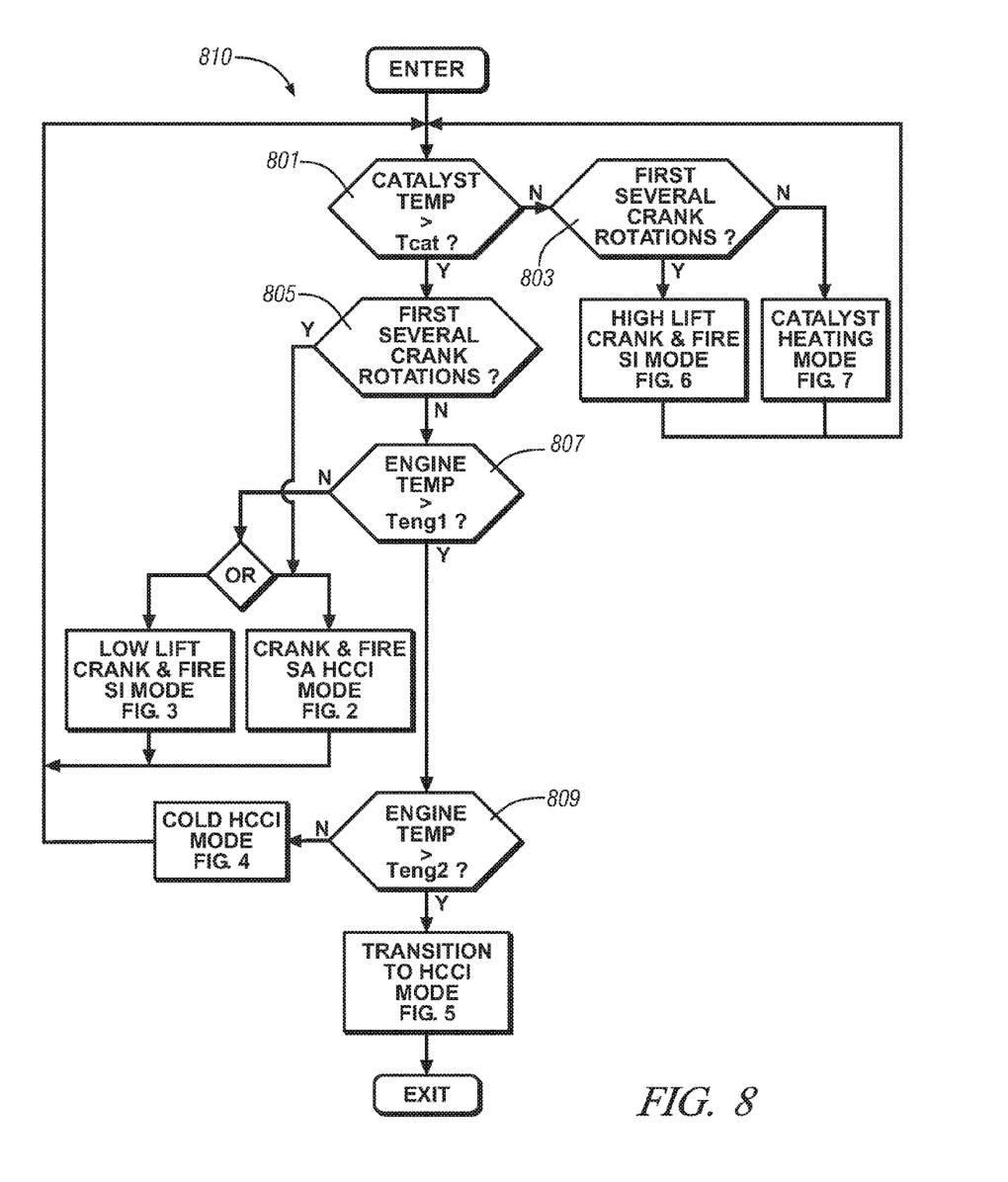
FIG. 8 illustrates a process for selectively implementing the various modes of FIGS. 2 through 7 in accordance with engine and catalyst temperatures in accordance with the present disclosure.

With reference now to FIG. 8, a process for selectively implementing the various modes of FIGS. 2 through 7 in accordance with engine and catalyst temperatures is illustrated. Routine 810 is initially invoked by control system 25 in response to an engine start request and is thereafter implemented until control is transferred to normal HCCI controls, for example, subsequent to catalyst and engine temperatures reaching respective predetermined thresholds. A first process 801 in the routine checks catalyst temperature to determine whether a predetermined threshold temperature, Tcat, has been reached. This threshold temperature for example may be between about 150 and 450 degrees Celsius and related to the particular catalyst employed. If catalyst temperature has not exceeded this threshold temperature, another process 803 determines whether the engine has completed a predetermined number of rotations during engine cranking. If the predetermined number of engine crank rotations has not occurred, then the high lift crank & fire mode of FIG. 6 is invoked. If, however, the predetermined number of engine crank rotations has occurred, then the catalyst heating mode of FIG. 7 is invoked.

Once the catalyst temperature has exceeded the threshold Tcat as determined at process 801, another process 805 determines whether the engine has completed a predetermined number of rotations during engine cranking. If the predetermined number of engine crank rotations has not occurred, then the crank & fire, spark assisted HCCI mode of FIG. 2 is invoked. If, however, the predetermined number of engine crank rotations has occurred, then another process 807 determines whether the engine temperature, indexed for example through engine coolant temperature, exceeds a first threshold temperature, Tcool1. Preferably, this threshold temperature Tcool1 can, for example, be about 40 to about 60 degrees Celsius, as measured by coolant temperature. If the engine temperature does not exceed this first threshold, then either one of the crank & fire, spark assisted HCCI mode of FIG. 2 or the low lift crank & fire, spark assisted mode of FIG. 3 is invoked. The two modes of FIG. 2 and FIG. 3 are alternatives which may be invoked in accordance with other factors not discussed herein.

Once the engine temperature has exceeded the threshold Tcool1 as determined at process 807, another process 809 determines whether the engine engine temperature exceeds a second threshold temperature, Tcool2, which is higher than Tcool1. Preferably, this threshold temperature Tcool2 can, for example, be about 80 to about 90 degrees Celsius, as measured by coolant temperature, and generally represents a substantially fully warmed up engine. If the engine temperature does not exceed this second threshold, then the cold HCCI mode of FIG. 4 is invoked.

Once the engine temperature has exceeded the threshold Tcool2 as determined at process 809, the transition to HCCI mode of FIG. 5 is invoked and the routine will exit in favor of fully warmed up HCCI mode combustion controls.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method of operating a four-stroke internal combustion engine including a variable volume combustion chamber defined by a piston reciprocating within a cylinder between top-dead center and bottom-dead center points, intake and exhaust passages, and intake and exhaust valves controlled during repetitive, sequential exhaust, intake, compression and expansion strokes of said piston, a direct injection fuel system and a spark ignition system, comprising:

selectively implementing ones of a plurality of operating modes in response to predetermined catalyst and engine temperature conditions, wherein said selectively implementing comprises:
monitoring a catalyst temperature;
monitoring an engine temperature;
if said catalyst temperature is less than a threshold catalyst temperature, operating said engine in a high-lift cams, spark ignition mode including a near stoichiometric air/fuel ratio and full lift and duration valve events; and
if said catalyst temperature is not less than a threshold catalyst temperature and if said engine temperature is greater than a threshold engine temperature, operating said engine in a homogeneous charge compression ignition mode.

2. Method of operating a four-stroke internal combustion engine including a variable volume combustion chamber defined by a piston reciprocating within a cylinder between top-dead center and bottom-dead center points, intake and exhaust passages, and intake and exhaust valves controlled during repetitive, sequential exhaust, intake, compression and expansion strokes of said piston, a direct injection fuel system and a spark ignition system, comprising:
selectively implementing ones of a plurality of operating modes in response to predetermined catalyst and engine temperature conditions, wherein said selectively implementing comprises:
monitoring a catalyst temperature;
if said catalyst temperature is less than a threshold catalyst temperature, operating said engine in a high-lift cams, spark ignition mode including a near stoichiometric air/fuel ratio and full lift and duration valve events; and
if said catalyst temperature is not less than a threshold catalyst temperature, operating said engine in a low-lift cams mode;
wherein said high-lift cams, spark ignition mode comprises:
monitoring a crank rotation count;
if said crank rotation count is less than a threshold crank rotation count, said operating in said high-lift cams, spark ignition mode further comprising a high-lift cams, crank and fire, spark ignition mode with a minimum negative valve overlap and a spark delivery between 0 and 50 crank angle degrees before top dead center combustion; and
if said crank rotation count is not less than said threshold crank rotation count, said operating in said high-lift cams, spark ignition mode further comprising a high-lift cams, catalyst heating, spark ignition mode with a modest negative valve overlap and a retarded spark delivery between 0 and 30 crank angle degrees after top dead center combustion.

3. The method of claim 2, wherein said high-lift cams, crank and fire, spark ignition mode comprises a minimum negative valve overlap between −40 and 0 crank angle degrees.

4. The method of claim 2, wherein said high-lift cams, catalyst heating, spark ignition mode comprises a modest negative valve overlap between 0 and 40 crank angle degrees.

5. The method of claim 2, wherein said high-lift cams, crank and fire, spark ignition mode further comprises a single fuel injection.

6. The method of claim 5, wherein said single fuel injection ends between 60 and 120 crank angle degrees before top dead center combustion.

7. The method of claim 2, wherein said high-lift cams, crank and fire, spark ignition mode further comprises a split fuel injection.

8. The method of claim 7, wherein said split fuel injection comprises a first fuel injection ending between 120 and 160 crank angle degrees before top dead center combustion and a second fuel injection ending between 60 and 90 crank angle degrees before top dead center combustion.

9. The method of claim 2, wherein said high-lift cams, catalyst heating, spark ignition mode further comprises a split fuel injection.

10. The method of claim 9, wherein said split fuel injection comprises a first fuel injection ending between 250 and 290 crank angle degrees before top dead center combustion and a second fuel injection ending between 10 and 60 crank angle degrees before top dead center combustion.

11. Method of operating a four-stroke internal combustion engine including a variable volume combustion chamber defined by a piston reciprocating within a cylinder between top-dead center and bottom-dead center points, intake and exhaust passages, and intake and exhaust valves controlled during repetitive, sequential exhaust, intake, compression and expansion strokes of said piston, a direct injection fuel system and a spark ignition system, comprising:
selectively implementing ones of a plurality of operating modes in response to predetermined catalyst and engine temperature conditions, wherein said selectively implementing comprises:
monitoring a catalyst temperature;
if said catalyst temperature is less than a threshold catalyst temperature, operating said engine in a high-lift cams, spark ignition mode including a near stoichiometric air/fuel ratio and full lift and duration valve events; and
if said catalyst temperature is not less than a threshold catalyst temperature, operating said engine in a low-lift cams mode;
wherein said low-lift cams mode comprises:
monitoring a crank rotation count;
if said crank rotation count is less than a threshold crank rotation count, said operating in said low-lift cams mode further comprising a low-lift cams, crank and fire, spark assist HCCI mode; and
if said crank rotation count is not less than said threshold crank rotation count, said operating in said low-lift cams mode further comprising:
monitoring an engine temperature;
if said engine temperature is less than a first engine temperature threshold, said operating in said low-lift cams mode comprising a low-lift cams, crank and fire mode; and
if said engine temperature is not less than said first engine temperature threshold, said operating in said low-lift cams mode comprising a low-lift cams, modified HCCI mode.

12. The method of claim 11, wherein said low-lift cams, crank and fire, spark assist HCCI mode comprises a moderate negative valve overlap and a split fuel injection.

13. The method of claim 12, wherein said low-lift cams, crank and fire mode comprises said low-lift cams, crank and fire, spark assist HCCI mode.

14. The method of claim 12, wherein said split fuel injection comprises a first fuel injection ending between 350 and 360 crank angle degrees before top dead center combustion, a second fuel injection ending between 270 and 300 crank angle degrees before top dead center combustion, and said spark assist comprises a spark delivery between 0 and 10 crank angle degrees before top dead center combustion.

15. The method of claim 11, wherein said low-lift cams, crank and fire mode comprises a low-lift cams, crank and fire, spark ignition mode including a near stoichiometric air/fuel ratio, a modest to minimal negative valve overlap, and a split fuel injection.

16. The method of claim 15, wherein said low-lift cams, crank and fire, spark ignition mode comprises a negative valve overlap between 0 and 60 crank angle degrees, said split fuel injection comprises a first fuel injection ending between 300 and 360 crank angle degrees before top dead center combustion and a second fuel injection ending between 10 and 60 crank angle degrees before top dead center combustion, and said spark ignition comprises a spark delivery between 0 and 50 crank angle degrees before top dead center combustion.

17. The method of claim 11, wherein said low-lift cams, modified HCCI mode comprises:
   if said engine temperature is less than a second engine temperature threshold, said low-lift cams, modified HCCI mode comprising a low-lift cams, cold HCCI mode; and
   if said engine temperature is not less than said second engine temperature threshold, said low-lift cams, modified HCCI mode comprising a transition to HCCI mode.

18. The method of claim 17, wherein said low-lift cams, cold HCCI mode comprises:
   a moderate negative valve overlap;
   a split fuel injection, comprising a first fuel injection ending between 360 and 370 crank angle degrees before top dead center combustion and a second fuel injection ending between 270 and 300 crank angle degrees before top dead center combustion; and
   a spark delivery between 10 and 60 crank angle degrees before top dead center combustion.

19. The method of claim 17, wherein said low-lift cams, transition to HCCI mode comprises:
   a moderate negative valve overlap;
   a split fuel injection, comprising a first fuel injection ending between 370 and 440 crank angle degrees before top dead center combustion and a second fuel injection ending between 25 and 50 crank angle degrees before top dead center combustion;
   and a spark delivery between 10 and 60 crank angle degrees before top dead center combustion.

* * * * *